(12) United States Patent
Yuasa

(10) Patent No.: US 10,399,460 B2
(45) Date of Patent: Sep. 3, 2019

(54) POWER TRANSFER SYSTEM, POWER TRANSMISSION DEVICE, AND POWER RECEIVING DEVICE

(71) Applicant: TOYOTA JIDOSHA KABUSHIKI KAISHA, Toyota-shi, Aichi-ken (JP)

(72) Inventor: Hiroaki Yuasa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 302 days.

(21) Appl. No.: 15/518,329

(22) PCT Filed: Aug. 12, 2015

(86) PCT No.: PCT/JP2015/004036
§ 371 (c)(1),
(2) Date: Apr. 11, 2017

(87) PCT Pub. No.: WO2016/067500
PCT Pub. Date: May 6, 2016

(65) Prior Publication Data
US 2017/0326993 A1    Nov. 16, 2017

(30) Foreign Application Priority Data
Oct. 28, 2014  (JP) .................... 2014-219425

(51) Int. Cl.
| B60L 53/12 | (2019.01) |
| --- | --- |
| H01F 38/14 | (2006.01) |
| H02J 50/12 | (2016.01) |
| H02J 7/02 | (2016.01) |
| B60L 53/38 | (2019.01) |

(52) U.S. Cl.
CPC .............. *B60L 53/12* (2019.02); *H01F 38/14* (2013.01); *H02J 7/025* (2013.01); *H02J 50/12* (2016.02); *B60L 53/38* (2019.02)

(58) Field of Classification Search
CPC .......... B60L 50/50; B60L 50/53; B60L 53/00; B60L 53/12; B60L 53/14; B60L 53/34; B60L 53/39; H02J 50/12; H02J 7/025; H01F 38/14
See application file for complete search history.

(56) References Cited

U.S. PATENT DOCUMENTS

| 7,741,734 B2 | 6/2010 | Joannopoulos et al. |
| --- | --- | --- |
| 2007/0222542 A1 | 9/2007 | Joannopoulos et al. |
| 2008/0278264 A1 | 11/2008 | Karalis et al. |

(Continued)

FOREIGN PATENT DOCUMENTS

| AU | 2006269374 B2 | 10/2009 |
| --- | --- | --- |
| AU | 2007349874 A2 | 1/2010 |

(Continued)

*Primary Examiner* — Carlos Amaya
(74) *Attorney, Agent, or Firm* — Oliff PLC

(57) ABSTRACT

In this power transfer system, a power receiving coil and a power transmission coil are wound such that a first power transmission winding portion and a second power receiving winding portion do not overlap with each other when the first power transmission winding portion and the first power receiving winding portion overlap with each other at a position where a power transmission winding axis and a power receiving winding axis are positionally displaced when viewed in a plan view.

7 Claims, 8 Drawing Sheets

(56) References Cited

U.S. PATENT DOCUMENTS

| | | |
|---|---|---|
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2010/0277121 A1 * | 11/2010 | Hall ................ B60L 53/60 320/108 |
| 2012/0112552 A1 | 5/2012 | Baarman et al. |
| 2012/0212069 A1 | 8/2012 | Kawano et al. |
| 2013/0127409 A1 | 5/2013 | Ichikawa |
| 2013/0193749 A1 | 8/2013 | Nakamura et al. |
| 2014/0015341 A1 | 1/2014 | Kagami et al. |
| 2014/0084857 A1 | 3/2014 | Liu et al. |
| 2015/0008877 A1 | 1/2015 | Ichikawa et al. |
| 2015/0326056 A1 | 11/2015 | Koyanagi et al. |

FOREIGN PATENT DOCUMENTS

| | | |
|---|---|---|
| AU | 2010200044 A1 | 1/2010 |
| AU | 2006269374 C1 | 3/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| CN | 103477533 A | 12/2013 |
| EP | 1 902 505 A2 | 3/2008 |
| EP | 2 130 287 A1 | 12/2009 |
| IN | 735/DELNP/2008 | 9/2008 |
| IN | 6195/DELNP/2009 | 2/2010 |
| JP | 2009-501510 A | 1/2009 |
| JP | 2011-115017 A | 6/2011 |
| JP | 2012-138976 A | 7/2012 |
| JP | 2012-0174727 A | 9/2012 |
| JP | 2012-200031 A | 10/2012 |
| JP | 2012-200032 A | 10/2012 |
| JP | 2013-110822 A | 6/2013 |
| JP | 2013-125620 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2013-540411 A | 10/2013 |
| JP | 2014-011852 A | 1/2014 |
| JP | 2014-39462 A | 2/2014 |
| KR | 2008-0031398 A | 4/2008 |
| KR | 2010-0015954 A | 2/2010 |
| WO | 2007008646 A2 | 1/2007 |
| WO | 2008118178 A1 | 10/2008 |
| WO | 2010/006078 A1 | 1/2010 |

* cited by examiner

POWER TRANSFER SYSTEM, POWER TRANSMISSION DEVICE, AND POWER RECEIVING DEVICE

TECHNICAL FIELD

The present invention relates to a power transfer system including a power receiving device which contactlessly receives electric power from a power transmission device, and a power transmission device and a power receiving device thereof.

BACKGROUND ART

As disclosed in PTLs 1 to 7, there has been a known power transfer system which contactlessly transmit and receive electric power using a power transmission device and a power receiving device. According to the power transfer systems disclosed in these documents, a shape of a power transmission coil on the power transmission device and a shape of a power receiving coil on the power receiving device substantially match with each other.

CITATION LIST

Patent Literature

[PTL 1] Japanese Patent Laying-Open No. 2013-154815
[PTL 2] Japanese Patent Laying-Open No. 2013-146154
[PTL 3] Japanese Patent Laying-Open No. 2013-146148
[PTL 4] Japanese Patent Laying-Open No. 2013-110822
[PTL 5] Japanese Patent Laying-Open No. 2013-126327
[PTL 6] Japanese Patent Laying-Open No. 2014-011852
[PTL 7] Japanese Patent Laying-Open No. 2014-039462

SUMMARY OF INVENTION

Technical Problem

At the time of transferring electric power, in order to improve a positional displacement performance between a power transmission coil and a power receiving coil, it has been proposed to set a size of the power transmission coil to be larger than that of the power receiving coil. In a case where a coil having an annular shape is employed for an outer shape of the power transmission coil and power receiving coil, and center positions of the power transmission coil and the power receiving coil match with each other (correctly positioned state), a coupling coefficient ($\kappa$) becomes large. On the other hand, when the center positions of the power transmission coil and the power receiving coil are displaced (positionally displaced state), a coupling coefficient ($\kappa$) becomes small.

When the power transmission coil and the power receiving coil are in the correctly positioned state, a magnetic path is formed favorably, so that a high coupling coefficient ($\kappa$) can be obtained. On the other hand, in the positionally displaced state, for example, two magnetic paths are formed from one location of the power transmission coil with respect to the power receiving coil. Accordingly, when the positional displacement occurs, the coupling coefficient ($\kappa$) is lowered significantly, so that the transmission efficiency of electric power is lowered.

The present invention was made in view of the problem described above, and its object is to provide a power transfer system, a power transmission device, and a power receiving device configured to be able to suppress a variation in a coupling coefficient ($\kappa$) in the power transfer system either in the case where a power transmission coil and a power receiving coil are in the correctly positioned state or in the case where the power transmission coil and power receiving coil are in the positionally displaced state.

Solution to Problem

In this power transfer system, power transmission device, and power receiving device, the above-described power receiving coil and the above-described power transmission coil are wound such that the above-described first power transmission winding portion and the above-described second power receiving winding portion do not overlap with each other when the above-described first power transmission winding portion and the above-described first power receiving winding portion overlap with each other at a position where a power transmission winding axis and a power receiving winding axis are positionally displaced when viewed in a plan view.

According to this configuration, when the power transmission winding axis and the power receiving winding axis are positionally displaced, and a magnetic circuit is formed between the first power transmission winding portion and the first power receiving winding portion, a magnetic circuit is not formed between the first power transmission winding portion and the second power receiving winding portion. Consequently, lowering of a coupling coefficient and lowering of a transmission efficiency of electric power can be reduced.

Advantageous Effects of Invention

In this power transfer system, power transmission device, and power receiving device, the power transfer system can be provided which is configured to be able to reduce a variation in a coupling coefficient ($\kappa$) either in the case where a power transmission coil and a power receiving coil are in a correctly positioned state or in the case where the power transmission coil and the power receiving coil are in a positionally displaced state.

DESCRIPTION OF EMBODIMENTS

Figure 1:
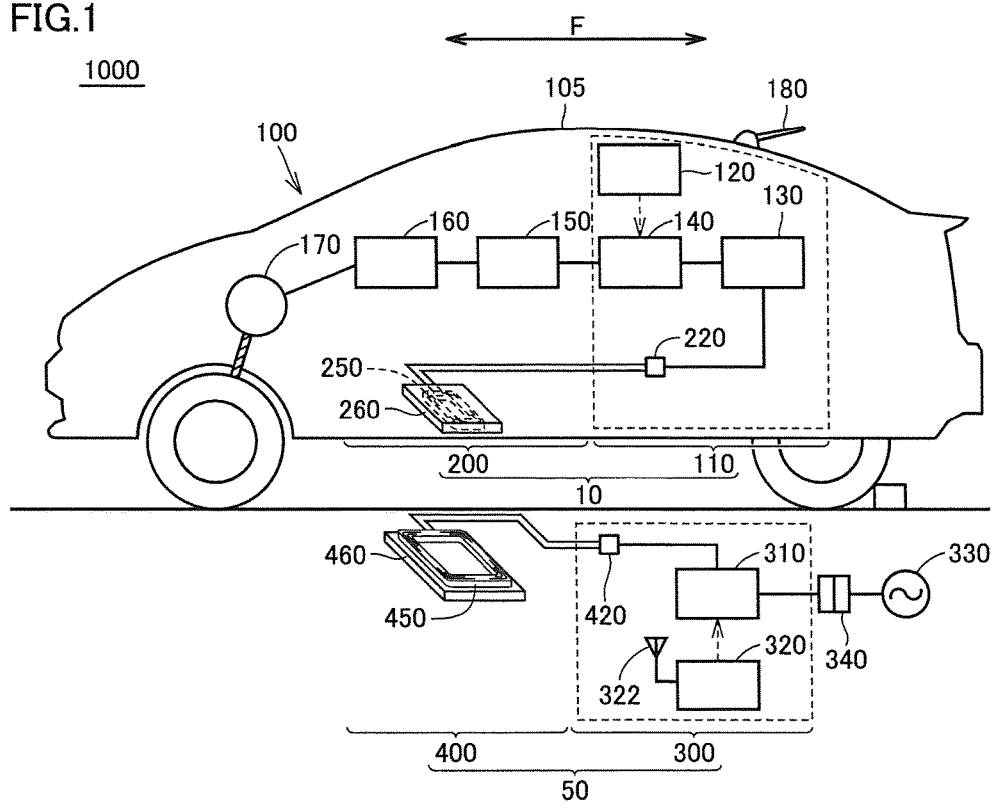
FIG. 1 represents a power transfer system in the embodiment.

An embodiment in accordance with one example based on the present invention will be described below with reference to the drawings. In the embodiment described below, when the number and amount are mentioned, the scope of the present invention is not limited to those number and amount unless particularly noted. The same parts or corresponding parts have the same reference numerals, and there is a case where the overlapping description will not be repeated. Use of the configurations of the embodiment in appropriate combinations was intended originally. The drawings are not drawn based on actual dimensional ratios, and they are drawn with partially different ratios to facilitate understanding of the structure.

In each of the drawings used below, the direction indicated by the arrow F in the drawing represents a vehicle front and back direction which includes a forward direction and a backward direction of a vehicle, and the direction indicated by the arrow W represents a vehicle width direction which includes a leftward and rightward direction orthogonal to the vehicle forward and backward direction.

(Power Transfer System 1000)

Referring to FIG. 1, a power transfer system 1000 which contactlessly transfers electric power will be described. Power transfer system 1000 includes a power receiving device 10 mounted to an electrically driven vehicle 100 and a power transmission device 50 installed in a facility side such as a parking lot. Electrically driven vehicle 100 includes power receiving device 10 and a vehicle main body 105.

(Power Receiving Device 10)

Power receiving device 10 includes a power receiving coil unit 200, and an electric device 110 provided between power receiving coil unit 200 and a battery 150 as a power storage device which stores electric power received by power receiving coil unit 200. Power receiving coil unit 200 has a power receiving coil 250 and a plate-like ferrite plate 260. In the present embodiment, a volute coil having a substantially rectangular annular form in appearance is employed as power receiving coil 250. Electric device 110 has a capacitor 120, a rectifier 130, a DC/DC converter 140, and the like. In the drawings, power receiving coil 250 and capacitor 220 are connected in series. However, power receiving coil 250 and capacitor 220 may be connected in parallel.

Vehicle main body 105 includes battery 150 connected to DC/DC converter 140 of electric device 110, a power control unit 160, a motor unit 170, a communication unit 180, and the like.

The winding number of power receiving coil 250 is appropriately set such that a distance between power receiving coil 250 and a power transmission coil 450 which will be described later, a Q value (for example, $Q \geq 100$) indicating a resonance strength between power receiving coil 250 and power transmission coil 450, and a coupling coefficient (κ) indicating the degree of coupling become greater. Power receiving coil 250 is connected to rectifier 130 through capacitor 220. Rectifier 130 converts an alternate current supplied from power receiving coil unit 200 into a direct current and supplies the same to DC/DC converter 140.

(Power Transmission Device 50)

Power transmission device 50 includes a power transmission coil unit 400 and an electric device 300. Power transmission coil unit 400 has power transmission coil 450 and a plate-like ferrite plate 460. In the present embodiment, a volute coil having a substantially rectangular annular form in appearance is employed as power transmission coil 450. Electric device 300 includes a capacitor 420, a high-frequency power device 310, a power transmission ECU 320, and a communication unit 322. A connection with an external alternator 330 is made detachably with use of a plug 340 and the like. In the drawings, power transmission coil 450 and capacitor 420 are connected in series. However, power transmission coil 450 and capacitor 420 may be connected in parallel.

High-frequency power device 310 converts electric power received from alternator 330 into high-frequency electric power, and supplies the converted high-frequency power to power transmission coil 450. Power transmission coil 450 contactlessly transmits electric power to power receiving coil 250 of power receiving coil unit 200 by means of electromagnetic induction.

(Detailed Configuration of Power Receiving Device 10)

Figure 2:
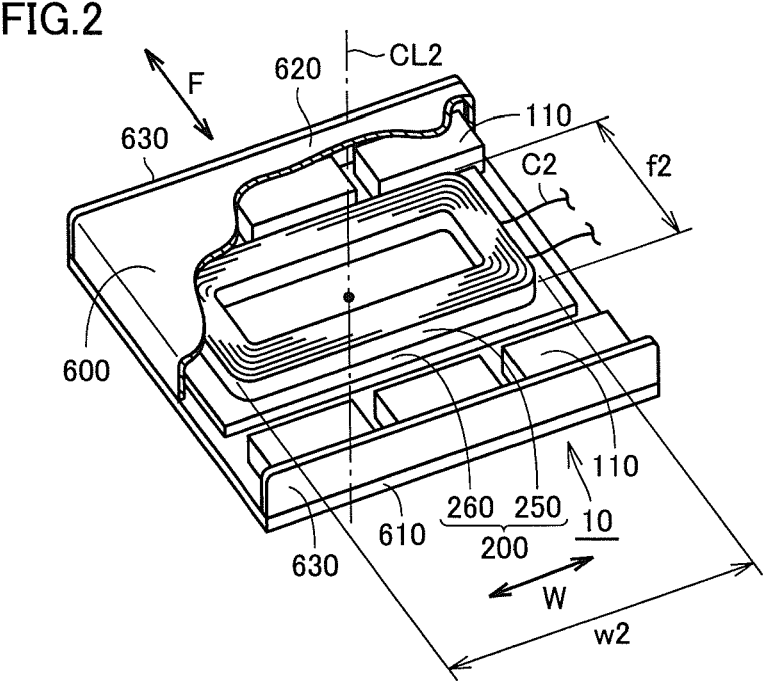
FIG. 2 is a perspective view representing a configuration of a power receiving device in the embodiment.

Referring to FIG. 2, the detailed configuration of power receiving device 10 in the present embodiment will be described. FIG. 2 is a perspective view representing a configuration of power receiving device 10. It should be noted that power receiving device 10 is generally mounted to a bottom surface of a vehicle and arranged such that power receiving coil 250 faces power transmission coil 450 (refer to FIG. 1). However, in FIG. 2, it is illustrated upside down for ease of description.

This power receiving device 10, as described above, has power receiving coil unit 200 which contactlessly receives electric power from power transmission device 50, and electric device 110 which is connected to power receiving coil unit 200, and these power receiving coil unit 200 and electric device 110 are accommodated in a casing 600. Thus, in power receiving device 10 in the present embodiment, power receiving coil unit 200 and electric device 110 are integrated. Casing 600 includes an installation wall 610, a cover member 620, and side walls 630.

Power receiving coil 250 employing a volute coil has a rectangular annular outer shape in which a coil line C2 is wound so as to surround a power receiving winding axis CL2 extending in the upward/downward direction of the vehicle. Power receiving coil 250 is wound such that a winding length (w2) in the vehicle width direction is longer than a winding length (f2) in the vehicle front and back direction. A position of power receiving winding axis CL2 is located at an intersection point where two diagonal lines of rectangular annular power receiving coil 250 intersect with each other. Herein, the winding length of power receiving coil 250 means a length measured based on an outer surface of coil line C2 located on an outermost side.

Further, in casing 600, electric device 110 is arranged in the vehicle front and back direction with respect to power receiving coil unit 200. It should be noted that, in FIG. 2, electric device 110 is divided and arranged in the front and back direction. However, electric device 110 may be arranged on a front side or a back side in the vehicle front and back direction of power receiving coil unit 200, or may be arranged in the vehicle width direction.

(Detailed Configuration of Power Transmission Device 50)

Figure 3:
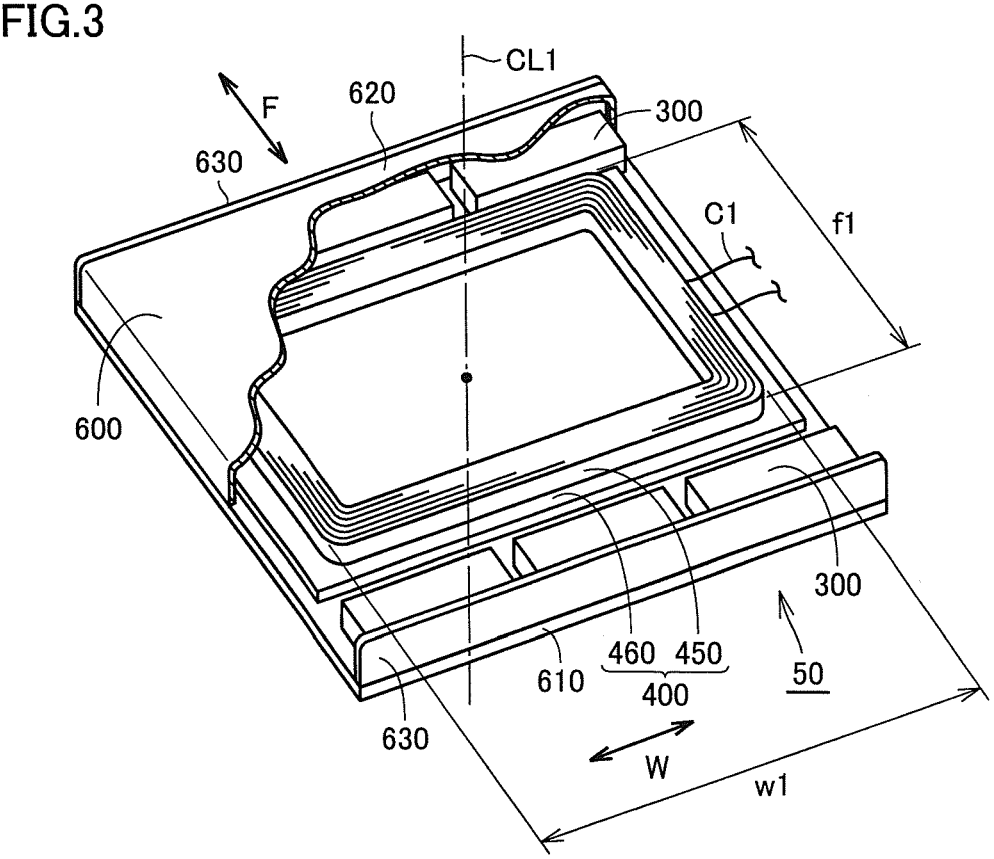
FIG. 3 is a perspective view representing a configuration of a power transmission device in the embodiment.

Referring to FIG. 3, a detailed configuration of power transmission device 50 in the present embodiment will be described. FIG. 3 is a perspective view representing a configuration of power transmission device 50. This power transmission device 50, as described above, has power transmission coil unit 400 which contactlessly transmits electric power to power receiving device 10, and electric device 300 which is connected to power transmission coil unit 400, and these power transmission coil unit 400 and electric device 300 are accommodated in casing 600. Thus, in power transmission device 50 in the present embodiment, power transmission coil unit 400 and electric device 300 are integrated. Casing 600 includes an installation wall 610, a cover member 620, and side walls 630.

Power transmission coil 450 employing a volute coil has a rectangular annular outer shape in which a coil line C1 is wound so as to surround a power transmission winding axis CL1 extending in the upward/downward direction of the vehicle. Power transmission coil 450 is wound such that a winding length (w1) in the vehicle width direction becomes longer than a winding length (f1) in the vehicle front and back direction. A position of power transmission winding axis CL1 is located at an intersection point where two diagonal lines of rectangular annular power receiving coil 250 intersect. Herein, the winding length of power transmission coil 450 means a length measured based on an outer surface of coil line C1 located on an outermost side.

Further, in casing 600, electric device 300 is arranged in the vehicle front and back direction with respect to power transmission coil unit 400. In FIG. 3, electric device 300 is divided and arranged in the front and back direction. However, electric device 300 may be arranged on a vehicle front side or back side of power transmission coil unit 400, or may be arranged in the width direction.

(Relationship Between Power Transmission Coil 450 and Power Receiving Coil 250)

Figure 4:
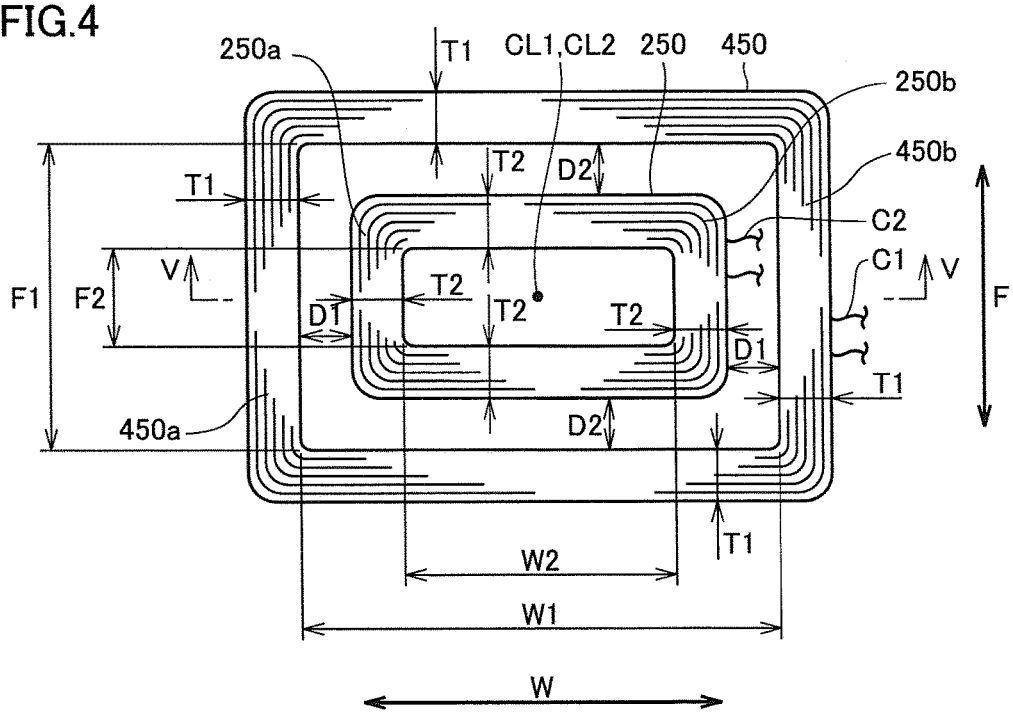
FIG. 4 is a plan view representing a state where the power transmission coil and the power receiving coil are correctly positioned in the embodiment.
Figure 5:
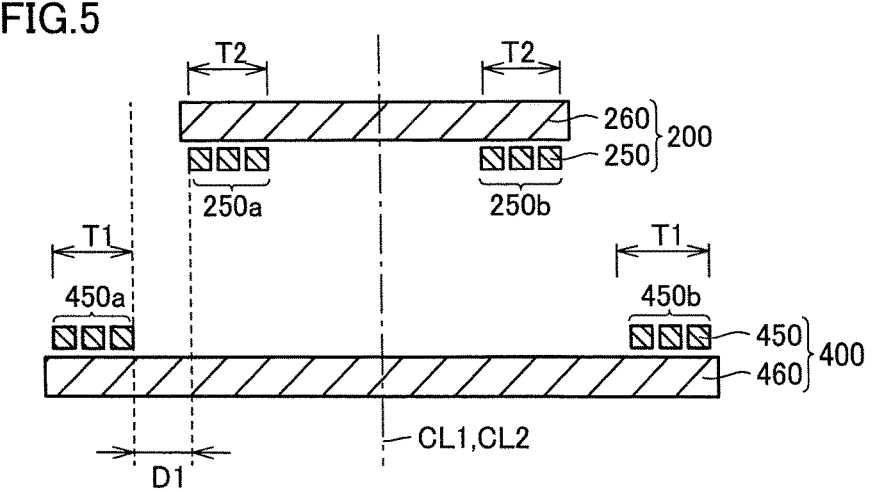
FIG. 5 is a cross sectional view taken along the V-V arrow line in FIG. 4.
Figure 6:
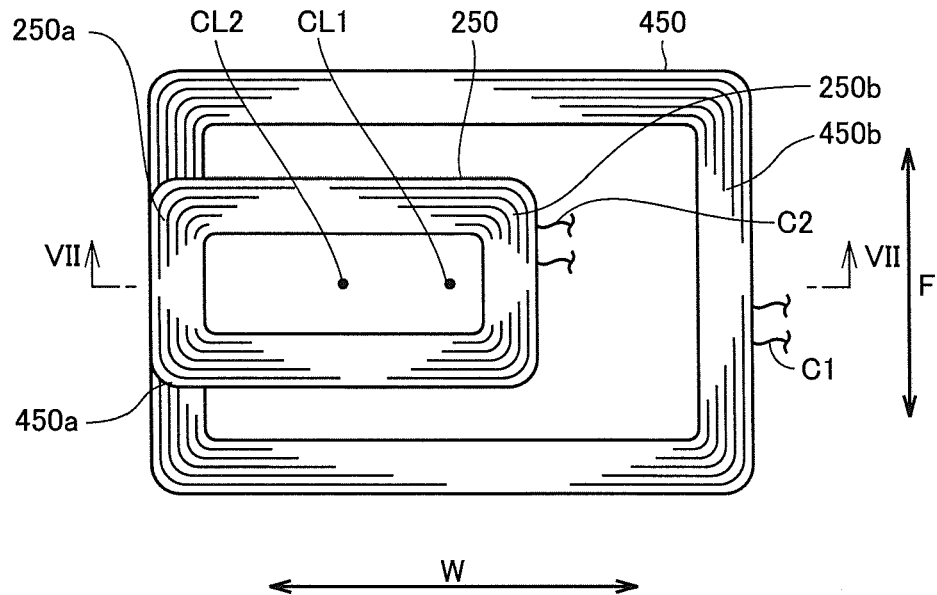
FIG. 6 is a first plan view representing a state where the power transmission coil and the power transmission coil are positionally displaced in a vehicle width direction in the embodiment.
Figure 7:
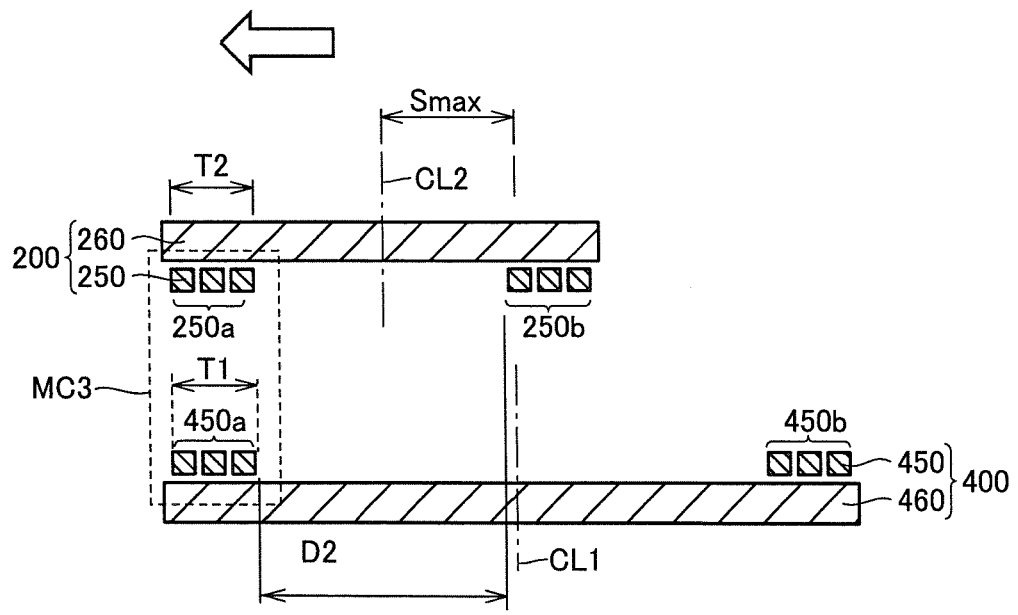
FIG. 7 is a cross sectional view taken along the VII-VII arrow line in FIG. 6.
Figure 8:
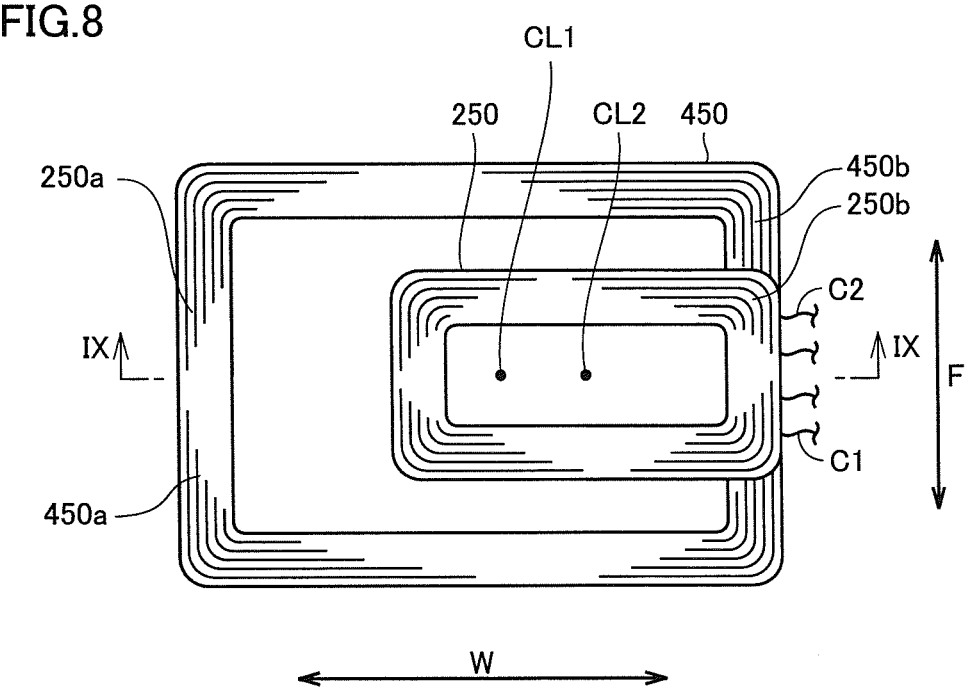
FIG. 8 is a second plan view representing a state where the power transmission coil and the power receiving coil are positionally displaced in a vehicle width direction in the embodiment.
Figure 9:
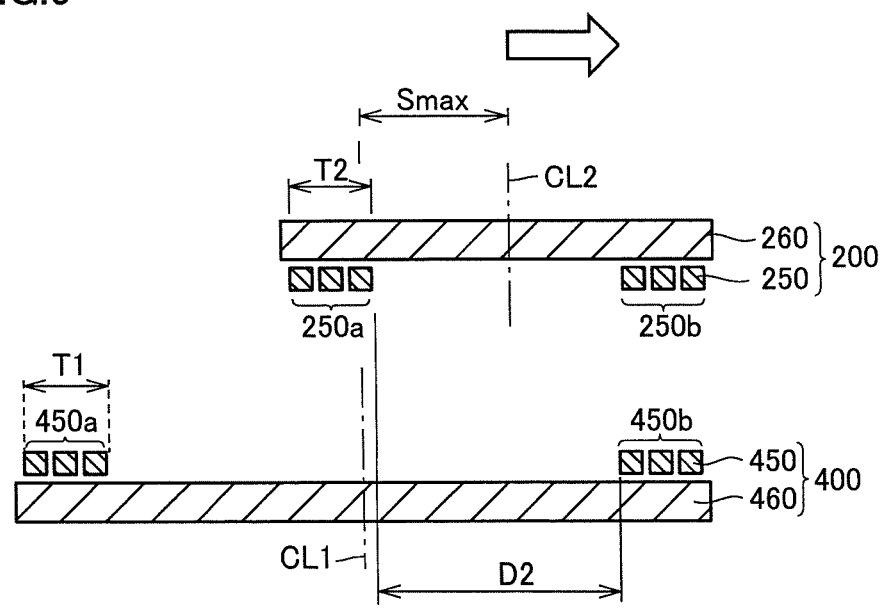
FIG. 9 is a cross sectional view taken along the IX-IX arrow line in FIG. 8.

Next, referring to FIGS. 4 to 9, a relationship between power transmission coil 450 and power receiving coil 250 will be described. FIG. 4 is a plan view representing a state where power transmission coil 450 and power receiving coil 250 are correctly positioned. FIG. 5 is a cross sectional view taken along the V-V arrow line in FIG. 4. FIG. 6 is a first plan view representing a state where power transmission coil 450 and power receiving coil 250 are displaced in the vehicle width direction. FIG. 7 is a cross sectional view taken along the VII-VII arrow line in FIG. 6. FIG. 8 is a second plan view representing a state where power transmission coil 450 and power receiving coil 250 are displaced in the vehicle width direction. FIG. 9 is a cross sectional view taken along the IX-IX arrow line in FIG. 8.

Firstly, referring to FIGS. 4 and 5 (particularly, FIG. 5), since power transmission coil 450 has a rectangular annular form in appearance, when power transmission coil 450 is viewed in cross section along the flat plane in vehicle width direction W including power transmission winding axis CL1, power transmission coil 450 has, across power transmission winding axis CL1 in vehicle width direction W (horizontal direction), a first power transmission winding portion 450a located on one side (left side in FIG. 5) and a second power transmission winding portion 450b located on the other side (right side in FIG. 5).

Since power receiving coil 250 also has a rectangular annular form in appearance, when power receiving coil 250 is viewed in cross section along the flat plane including power receiving winding axis CL2, power receiving coil 250 has, across power receiving winding axis CL2 in vehicle width direction W (horizontal direction), a first power receiving winding portion 250a located on one side (left side in FIG. 5) and a second power receiving winding portion 250b located on the other side (right side in FIG. 5).

Power transmission coil 450 and power receiving coil 250 have a form in which a winding width T1 of first power transmission winding portion 450a in vehicle width direction W (horizontal direction) and a winding width T2 of first power receiving winding portion 250a in vehicle width direction W (horizontal direction) substantially matches with each other, and a form in which a winding width T1 of second power transmission winding portion 450b in vehicle width direction W (horizontal direction) and a winding width T2 of second power receiving winding portion 250b in vehicle width direction W (horizontal direction) substantially matches with each other. In other words, the winding width of power transmission coil 450 is substantially the same in an entire circumference, and the winding width of power receiving coil 250 is also substantially the same in an entire circumference, and the winding width of power transmission coil 450 and the winding width of power receiving coil 250 substantially match with each other.

Referring to FIG. 4, in the present embodiment, a space W1 in vehicle width direction W between first power transmission winding portion 450a and second power transmission winding portion 450b is set to be larger than a space F1 in vehicle front and back direction F between first power transmission winding portion 450a and second power transmission winding portion 450b, and a space W2 in vehicle width direction W between first power receiving winding portion 250a and second power receiving winding portion 250b is set to be larger than a space F2 in vehicle front and back direction F between first power receiving winding portion 250a and second power receiving winding portion 250b. In other words, power transmission coil 450 and power receiving coil 250 have a laterally oblong form in which a length in vehicle width direction W is longer than a length in vehicle front and back direction F.

(Correctly Positioned State)

As shown in FIGS. 4 and 5, in a state where power transmission coil 450 and power receiving coil 250 are correctly positioned, power transmission winding axis CL1 and power receiving winding axis CL2 match with each other when viewed in a plan view, and the sides are in a parallel state. In this state, first power receiving winding portion 250a and second power receiving winding portion 250b are located on a side of power transmission winding axis CL1 (inner side) of first power transmission winding portion 450a and second power transmission winding portion 450b, and first power receiving winding portion 250a and second power receiving winding portion 250b are arranged so as not to overlap with first power transmission winding portion 450a and second power transmission winding portion 450b. In other words, power receiving coil 250 is located on an inner side of power transmission coil 450, and power receiving coil 250 has an outer shape which is smaller than the power transmission coil 450.

Herein, when power receiving coil 200 is positionally displaced by a distance D1 from the state shown in FIG. 5, first power receiving winding portion 250a and first power transmission winding portion 450a come close to each other, and, on the other hand, second power receiving winding portion 250b and second power transmission winding portion 450b are separated apart from each other.

While coupling of a magnetic path formed between second power receiving winding portion 250b and second power transmission winding portion 450b becomes smaller, coupling of a magnetic path between first power receiving winding portion 250a and first power transmission winding portion 450a becomes greater.

As a result, coupling between power transmission coil 400 and power receiving coil 200 can be maintained in a high state.

As described above, in FIGS. 4 and 5, since first power receiving winding portion 250a and second power receiving winding portion 250b are arranged with a space on an inner side of first power transmission winding portion 450a and second power transmission winding portion 450b (on a side of winding axes CL1, CL2) in a state where power transmission coil 400 and power receiving coil 200 are correctly positioned, a positional displacement performance can be improved.

Accordingly, although first power receiving winding portion 250a and first power transmission winding portion 450a are slightly separated apart from each other, and second power receiving winding portion 250b and second power transmission winding portion 450b are slightly separated apart from each other, magnetic circuits are formed respectively between first power receiving winding portion 250a and first power transmission winding portion 450a and between second power receiving winding portion 250b and second power transmission winding portion 450b, so that a high coupling coefficient (κ) is maintained. Herein, a space (D1) between first power receiving winding portion 250a and first power transmission winding portion 450a is set to have a distance in which a favorable magnetic circuit can be formed. It similarly applies to the space between second power receiving winding portion 250b and second power transmission winding portion 450b.

(Positionally Displaced State)

On the other hand, referring to FIGS. 6 to 9, a case will be described where power transmission winding axis CL1 and power receiving winding axis CL2 are positionally displaced. A maximum displacement amount Smax between power transmission coil 450 and power receiving coil 250 is a distance defined so that electric power of a predetermined amount or greater can be contactlessly transmitted from power transmission device 50 to power receiving device 10 at a position where power receiving winding axis CL2 is displaced with respect to power transmission winding axis CL1 in vehicle width direction W.

In other words, maximum displacement amount Smax between power transmission winding axis CL1 and power receiving winding axis CL2 shown in FIG. 7 (vehicle width direction W, leftward direction in FIG. 7) means a displacement amount within a range in which a predetermined amount of electric power can be transmitted contactlessly from power transmission coil unit 400 to power receiving coil unit 200.

Referring to FIG. 6, power transmission coil 450 and power receiving coil 250 are wound such that, in the state where power transmission winding axis CL1 and power receiving winding axis CL2 are positionally displaced, first power receiving winding portion 250a overlaps with first power transmission winding portion 450a, and second power receiving winding portion 250b does not overlap with first power transmission winding portion 450a when viewed in a plan view. Herein, although first power receiving winding portion 250a and first power transmission winding portion 450a overlap with each other so that the winding width is matched, a positional displacement is permitted within a range in which a desired coupling coefficient (κ) is obtained.

On the other hand, referring to FIGS. 8 and 9, power transmission coil 450 and power receiving coil 250 are wound such that, in a state where power receiving winding axis CL2 is positionally displaced with respect to power transmission winding axis CL1 toward an opposite side (vehicle width direction W, rightward direction in FIG. 9), second power receiving winding portion 250b overlaps with second power transmission winding portion 450b, and first power receiving winding portion 250a does not overlap with second power receiving winding portion 250b. Maximum displacement amount Smax is the same as in the description above.

As described above, in the state where power receiving winding axis CL2 is positionally displaced with respect to power transmission winding axis CL1, for example, in the case of the state shown in FIG. 6, since first power transmission winding portion 450a and first power receiving winding portion 250a overlap with each other, a favorable magnetic circuit is formed between first power transmission winding portion 450a and first power receiving winding portion 250a. On the other hand, since first power transmission winding portion 450a and second power receiving winding portion 250b do not overlap with each other, a magnetic circuit which is in inverse to a magnetic circuit formed between first power transmission winding portion 450a and first power receiving winding portion 250a is not formed between first power transmission winding portion 450a and second power receiving winding portion 250b. Therefore, in the magnetic circuit between first power transmission winding portion 450a and first power receiving winding portion 250a, a high coupling coefficient (κ) is maintained.

Further, as shown in FIG. 7, since the widths of first power receiving winding portion 250a and first power transmission winding portion 450a substantially match with each other when power receiving coil 400 is positionally displaced to an extent causing first power receiving winding portion 250a and first power transmission winding portion 450a to face each other, a path length of a magnetic circuit MC3 formed between first power receiving winding portion 250a and first power transmission winding portion 450a can be shortened. Accordingly, a magnetic resistance of magnetic circuit MC3 can be reduced, so that a decrease in coupling coefficient κ between power transmission coil 400 and power receiving coil 200 can be suppressed without coupling second power receiving winding portion 250b and second power transmission winding portion 450b.

It should be noted that power transmission coil 450 and power receiving coil 250 are arranged such that distance D1 between first power receiving winding portion 250a and first power transmission winding portion 450a in FIG. 5 when viewed in a cross section along a flat plane passing through power transmission winding axis CL1 is set to be a distance causing magnetic coupling to occur in a state where power transmission coil 200 and power receiving coil 400 are correctly positioned. Similarly, distance D2 between second power receiving winding portion 250b and first power transmission winding portion 450a in FIG. 7 and distance D2 between first power receiving winding portion 250a and second power transmission winding portion 450b in FIG. 9 are set to be a distance which does not cause occurrence of magnetic coupling.

(Comparative Example)

Figure 10:
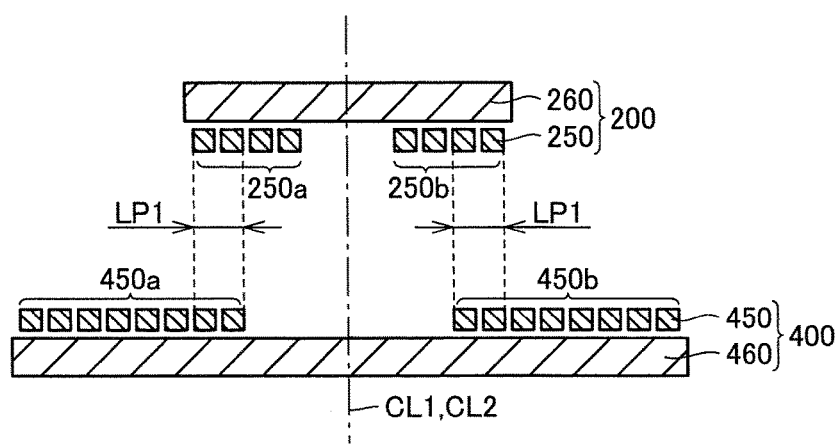
FIG. 10 is a cross sectional view representing a state where the power transmission coil and the power receiving coil are correctly positioned in a comparative example.
Figure 11:
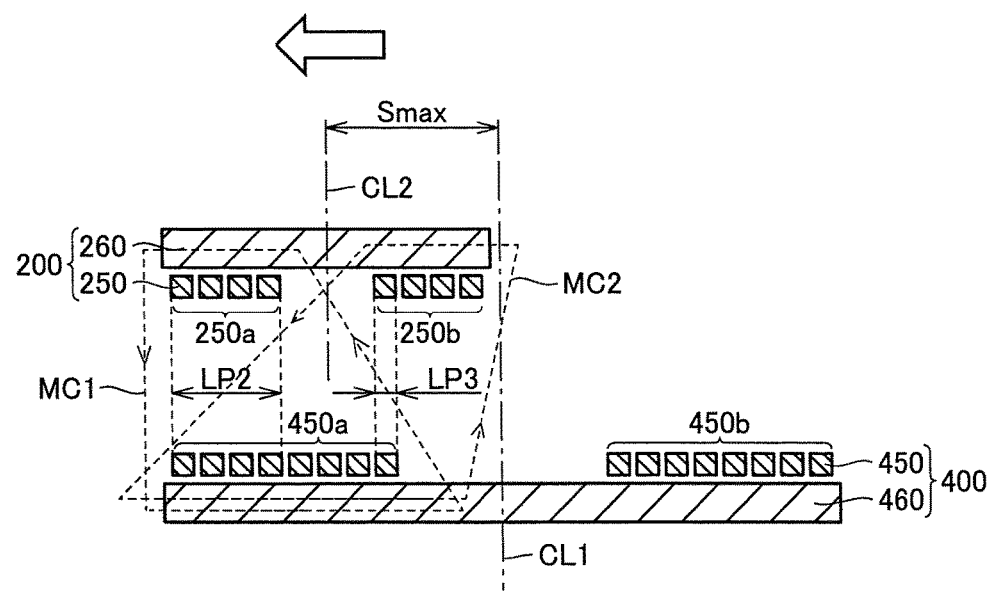
FIG. 11 is a cross sectional view representing a state where the power transmission coil and the power receiving coil are positionally displaced in the comparative example.

Herein, FIGS. 10 and 11 show a structure of a comparative example. FIG. 10 is a cross sectional view representing a state where power transmission coil 450 and power receiving coil 250 are correctly positioned in a comparative example. FIG. 11 is a cross sectional view representing a state where power transmission coil 450 and power receiving coil 250 are positionally displaced in a comparative example.

Referring to FIG. 10, in the structure of the comparative example, a region in which power transmission coil 450 and power receiving coil 250 overlap with each other in a state where power transmission coil 450 and power receiving coil 250 are correctly positioned is formed (region LP1). Accordingly, magnetic circuits are respectively formed between first power receiving winding portion 250a and first power transmission winding portion 450a, and between second power receiving winding portion 250b and second power transmission winding portion 450b.

On the other hand, as shown in FIG. 11, in a state where power transmission winding axis CL1 and power receiving winding axis CL2 are positionally displaced by a distance (Smax) (vehicle width direction W, leftward direction in FIG. 11), first power receiving winding portion 250a and second power receiving winding portion 250b overlap with first power transmission winding portion 450a (region LP2, region LP3). As a result, since a magnetic circuit MC1 formed between first power receiving winding portion 250a and first power transmission winding portion 450a and a magnetic circuit MC2 formed between second power receiving winding portion 250b and first power transmission winding portion 450a are inverse in directions, magnetic circuit MC1 causes a direction of an induced current generated in first power receiving winding portion 250a and a direction of an induced current generated in second power receiving winding portion 250b are inversed, so that it has been a factor of causing lowering of coupling coefficient (κ).

Moreover, in order to set transmitted electric power to be constant in such a case, it has been required to set a transmission voltage to be higher in the case with a large coupling coefficient (κ) and to set a transmission current larger in the case with a small coupling coefficient, thus it would be necessary to secure a high breakdown voltage and a breakdown current in the power transfer system.

However, in the configuration of the present embodiment, since a magnetic circuit is not formed between second power receiving winding portion 250b and first power transmission winding portion 450a as shown in FIG. 7, and a magnetic circuit is not formed between first power receiving winding portion 250a and second power transmission winding portion 450b as shown in FIG. 9, a high coupling coefficient (κ) can be maintained without affecting the magnetic circuit formed between power transmission coil 450 and power receiving coil 250. As a result, in the power transfer system, expansion of the breakdown voltage and breakdown current can be reduced.

In the above-described embodiment, in the state where power transmission coil 450 and power receiving coil 250 are correctly positioned, the space (D2) between power transmission coil 450 and power receiving coil 250 in vehicle front and back direction F and the space (D1) between power transmission coil 450 and power receiving coil 250 in vehicle width direction W are set to be equal. However, the sizes of the spaces may be different as described below.

Referring back to FIG. 4, in the present embodiment, in a state where power transmission coil 450 and power receiving coil 250 are correctly positioned, when the space (D2) between power transmission coil 450 and power receiving coil 250 in vehicle front and back direction F is set to be smaller than the space (D1) between power transmission coil 450 and power receiving coil 250 in vehicle width direction W (D1>D2), the following function and effect can be obtained.

Since the space between power transmission coil 450 and power receiving coil 250 is small in vehicle front and back direction F, power transmission coil 450 and power receiving coil 250 come close to and couple with each other. As a result, the coupled state is maintained even when power receiving coil 250 is positionally displaced in vehicle width direction W, so that a wide permissible range in vehicle width direction W can be provided.

Further, since a wheel stopper is provided in a general parking lot, a positional displacement in vehicle width direction W is more likely to be large than a positional displacement in vehicle front and back direction F. Even in such a case, some extent of a positional displacement in the width direction is permissible. Therefore, an effort to park a vehicle again can be omitted.

On the other hand, in a state where power transmission coil 400 and power receiving coil 200 are correctly positioned, when the space (D1) between power transmission coil 400 and power receiving coil 200 in vehicle width direction W is set to be smaller than the space (D2) between power transmission coil 400 and power receiving coil 200 in vehicle front and back direction F (D2>D1), the following function and effect can be obtained.

Since the space between power transmission coil 400 and power receiving coil 200 is small in vehicle width direction W, power transmission coil 450 and power receiving coil 250 come close to and couple with each other. As a result, even when a positional displacement occurs in vehicle front and back direction F, the coupling coefficient (κ) can be maintained.

Figure 12:
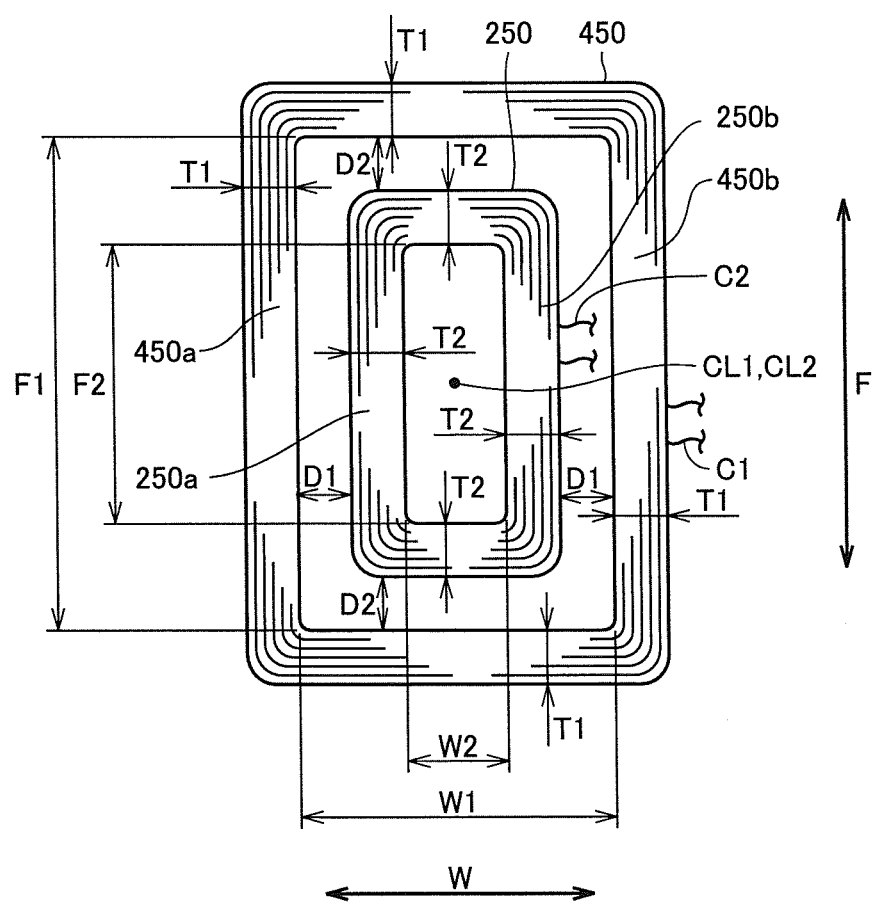
FIG. 12 is a plan view representing a state where the power transmission coil and the power receiving coil are correctly positioned in another embodiment.

It should be noted that, referring to FIG. 12, in the above-described embodiment, although power transmission coil 450 and power receiving coil 250 have a laterally oblong form in which a length in vehicle width direction W is longer than a length in vehicle front and back direction F, it may be in a vertically oblong form in which a length in vehicle width direction W is shorter than a length in vehicle front and back direction F.

Figure 13:
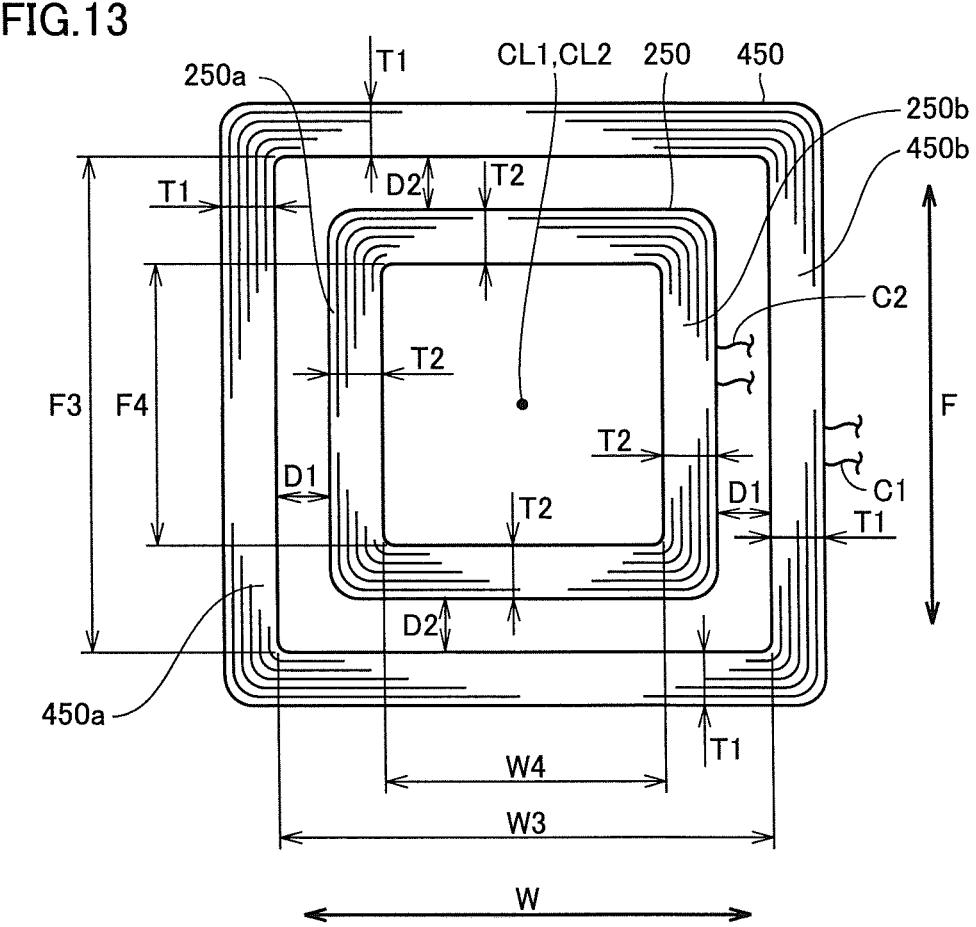
FIG. 13 is a plan view representing a state where the power transmission coil and the power receiving coil are correctly positioned in another embodiment.

Moreover, as shown in FIG. 13, a space (F3) between first power transmission winding portion 450a and second power transmission winding portion 450b, and a space (W3) between first power transmission winding portion 450a and second power transmission winding portion 450b may be set equal, and a space (F4) between first power receiving winding portion 250a and second power receiving winding portion 250b, and a space (W4) between first power receiving winding portion 250a and second power receiving winding portion 250b may be set equal. In other words, a square coil shape can be employed in each of power transmission coil 450 and power receiving coil 250. Moreover, a circular coil shape can also be employed in each of power transmission coil 450 and power receiving coil 250.

Moreover, even when the forms of FIGS. 12 and 13 are employed, a relationship between the space (D1), which is between power transmission coil 400 and power receiving coil 200 in vehicle width direction W, and the space (D2), which is between power transmission coil 400 and power receiving coil 200 in vehicle front and back direction F, (D1=D2, D>D2, D1<D2) is the same as the case described with reference to FIG. 4.

Moreover, in the above-described embodiment, the positional displacement in the vehicle front and back direction has been described. However, the same function and effect can be obtained for the positional displacement in the vehicle front and back direction with the same configuration.

It should be understood that the embodiments described herein are illustrative and non-restrictive in every respect. The scope of the present invention is defined by the terms of the claims, and is intended to include any modifications within the scope and meaning equivalent to the terms of the claims.

REFERENCE SIGNS LIST 10 power receiving device; 50 power transmission device; 100 electric motor; 105 vehicle main body; 110, 300 electric device; 120, 220, 420 capacitor; 130 rectifier; 140 converter; 150 battery; 160 power control unit; 170 motor unit; 180, 322 communication unit; 200 power receiving coil unit; 250 power receiving coil; 260, 460 ferrite plate; 310 high-frequency power device; 330 alternator; 400 power transmission coil unit; 450 power transmission coil; 600 casing; 610 installation wall; 620 cover member; 630 side wall; 1000 power transfer system.

The invention claimed is:

1. A power transfer system comprising: a power receiving device which is mounted to a vehicle; and a power transmission device which contactlessly transmits electric power to said receiving device in a state of facing with said power receiving device,
said power transmission device including an annular volute power transmission coil which is wound so as to surround a power transmission winding axis extending in an upward/downward direction of said vehicle,
said power receiving device including an annular volute power receiving coil which is wound so as to surround a power receiving winding axis extending in an upward/downward direction of said vehicle and has an outer shape smaller than that of said power transmission coil,
when said power transmission coil being viewed in cross section along a flat plane including said power transmission winding axis, said power transmission coil having, across said power transmission winding axis, a first power transmission winding portion located on one side and a second power transmission winding portion located on the other side, when said power receiving coil being viewed in cross section along a flat plane including said power receiving winding axis, said power receiving coil having, across said power receiving winding axis, a first power receiving winding portion located on one side and a second power receiving winding portion located on the other side,
when viewed in a plan view, said second power receiving winding portion being located on said second power transmission winding portion side relative to said power transmission winding axis,
said power receiving coil and said power transmission coil being wound such that said first power transmission winding portion and said second power receiving winding portion do not overlap with each other when said first power transmission winding portion and said first power receiving winding portion overlap with each other at a position where said power transmission winding axis and said power receiving winding axis are positionally displaced when viewed in a plan view.

2. The power transfer system according to claim 1, wherein said power receiving coil and said power transmission coil are wound such that, at a position where said power transmission winding axis and said power receiving winding axis match with each other, when viewed in a plan view, said first power receiving winding portion and said second power receiving winding portion are located on an inner side of said first power transmission winding portion and said second power transmission winding portion, which is a side of said power transmission winding axis, and said first power receiving winding portion and said second power receiving winding portion do not overlap with said first power transmission winding portion and said second power transmission winding portion.

3. The power transfer system according to claim 1, wherein
a winding width of said first power transmission winding portion and a winding width of said first power receiving winding portion substantially match with each other, and
a winding width of said second power transmission winding portion and a winding width of said second power receiving winding portion substantially match with each other.

4. The power transfer system according to claim 1, wherein in a state where said power transmission coil and said power receiving coil are correctly positioned, a space between said power transmission coil and said power receiving coil in a front and back direction of said vehicle is smaller than a space between said power transmission coil and said power receiving coil in a width direction of said vehicle.

5. The power transfer system according to claim 1, wherein in a state where said power transmission coil and said power receiving coil are correctly positioned, a space between said power transmission coil and said power receiving coil in a width direction of said vehicle is smaller than a space between said power transmission coil and said power receiving coil in a front and back direction of said vehicle.

6. A power receiving device which contactlessly receives electric power from a power transmission device provided outside of a vehicle, said power transmission device including an annular volute power transmission coil which is wound so as to surround a power transmission winding axis extending in an upward/downward direction of said vehicle,
said power receiving device including an annular volute power receiving coil which is wound so as to surround a power receiving winding axis extending in an upward/downward direction of said vehicle and has an outer shape smaller than that of said power transmission coil,
when viewing said power transmission coil in a cross sectional view taken along a flat plane including said power transmission winding axis, said power transmission coil having, across said power transmission winding axis, a first power transmission winding portion located on one side and a second power transmission winding portion located on the other side,
when viewing said power receiving coil in a cross sectional view taken along a flat plane including said power receiving winding axis, said power receiving coil having, across said power receiving winding axis, a first power receiving winding portion on one side and a second power receiving winding portion on the other side, when viewed in a plan view, said second power receiving winding portion being located on said second power transmission winding portion side relative, to said power transmission winding axis, said power receiving coil being formed such that said first power transmission winding portion and said second power receiving winding portion do not overlap with each other when said first power transmission winding portion and said first power receiving winding portion overlap with each other at a position where said power transmission winding axis and said power receiving winding axis are positionally displaced when viewed in a plan view.

7. A power transmission device which contactlessly transmits electric power from a power receiving device mounted to a vehicle, said power transmission device including an annular volute power transmission coil which is wound so as to surround a power transmission winding axis extending in an upward/downward direction of said vehicle, said power receiving device including an annular volute power receiving coil which is wound so as to surround a power receiving winding axis extending in an upward/downward direction of said vehicle and has an outer shape smaller than that of said power transmission coil, when viewing said power transmission coil in a cross sectional view taken along a flat plane including said power transmission winding axis, said power transmission coil having, across said power transmission winding axis, a first power transmission winding portion located on one side and a second power transmission winding portion located on the other side, when viewing said power receiving coil in a cross sectional view taken along a flat plane including said power receiving winding axis, said power receiving coil having, across said power receiving winding axis, a first power receiving winding portion on one side and a second power receiving winding portion on the other side, when viewed in a plan view, said second power receiving winding portion being located on said second power transmission winding portion side relative to said power, transmission winding axis, said power transmission coil being wound such that said first power transmission winding portion and said second power receiving winding portion do not overlap with each other when said first power transmission winding portion and said first power receiving winding portion overlap with each other at a position where said power transmission winding axis and said power receiving winding axis are positionally displaced when viewed in a plan view.

\* \* \* \* \*